United States Patent
Sohmuta

[19]

[11] Patent Number: 5,822,295
[45] Date of Patent: Oct. 13, 1998

[54] OPTICAL HEAD DEVICE TO MAXIMIZE THE EFFECTIVE DIAMETER OF AN OBJECTIVE LENS

[75] Inventor: Mitoshi Sohmuta, Tokyo, Japan

[73] Assignee: NEC Corporation, Tokyo, Japan

[21] Appl. No.: 734,019

[22] Filed: Oct. 18, 1996

[30] Foreign Application Priority Data

Oct. 18, 1995 [JP] Japan ................................. 7-269635

[51] Int. Cl.[6] ...................................................... G11B 7/00
[52] U.S. Cl. ........................................... 369/118; 369/112
[58] Field of Search ........................... 369/44.24, 44.31, 369/112, 118, 44.14, 44.15, 44.21, 44.22, 44.32

[56] References Cited

U.S. PATENT DOCUMENTS

| | | | |
|---|---|---|---|
| 4,411,500 | 10/1983 | Yonezawa et al. | 369/118 X |
| 5,155,718 | 10/1992 | Hashimoto et al. | 369/118 X |
| 5,293,366 | 3/1994 | Ohta | 369/44.31 |
| 5,555,232 | 9/1996 | Kobayashi et al. | 369/112 |

FOREIGN PATENT DOCUMENTS

4-95235  3/1992  Japan ..................................... 369/118

*Primary Examiner*—Paul W. Huber
*Attorney, Agent, or Firm*—Sughrue, Mion, Zinn, Macpeak & Seas, PLLC

[57] ABSTRACT

Disclosed is an optical head device which has: a laser light source; an objective lens to which light emitted from the laser light source is entered through a beam splitter and in which the light is collected to be focused as a very small spot on a recording surface of an optical disk medium; an optical detector to which modulated light reflected on the recording surface of the optical disk medium is entered through the objective lens and the beam splitter; and a shading plate which is located between the laser light source and the beam splitter and through which a central part of the light emitted from the laser light source is passed; wherein the objective lens is designed to have an effective diameter greater than a diameter of the laser light output from the beam splitter.

2 Claims, 9 Drawing Sheets

OBJECTIVE LENS SHIFTING TO THE LEFT

FIG. 3B PRIOR ART

OBJECTIVE LENS LOCATING AT THE CENTER

FIG. 3C PRIOR ART

OBJECTIVE LENS SHIFTING TO THE RIGHT

FIG. 4

FIG.5 a : EFFECTIVE DIAMETER OF OBJECTIVE LENS
b : DIAMETER OF LASER BEAM

FIG.6A

OBJECTIVE LENS SHIFTING TO THE LEFT

FIG.6B

OBJECTIVE LENS LOCATING AT THE CENTER

FIG.6C

OBJECTIVE LENS SHIFTING TO THE RIGHT

OPTICAL HEAD DEVICE TO MAXIMIZE THE EFFECTIVE DIAMETER OF AN OBJECTIVE LENS

FIELD OF THE INVENTION

This invention relates to an optical head device and more particularly to, an optical head device used in an optical recording and reproducing apparatus which is used for recording and reproducing on an optical disk etc.

BACKGROUND OF THE INVENTION

Figure 1:
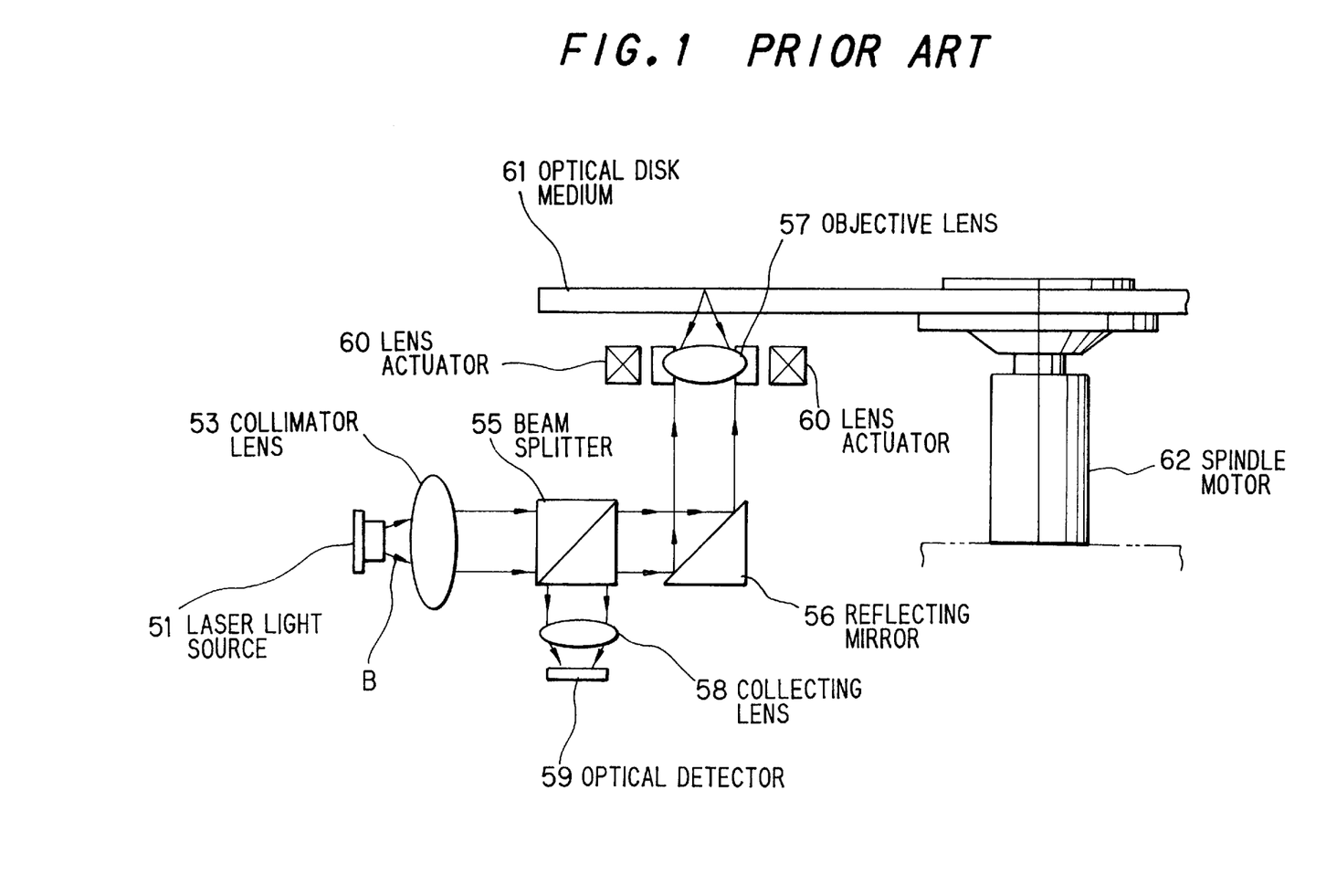
FIG. 1 is an explanatory schematic diagram showing a conventional optical head device.

FIG.1 shows a conventional optical head device. The conventional optical head device comprises a laser light source(semiconductor laser) 51, a collimator lens 53 for arranging laser light B emitted from the laser light source 51 into a parallel beam, a beam splitter 55, a reflecting mirror 56 for rising, an objective lens 57, a lens actuator 60 for shifting the objective lens 57 forward and backward or leftward and rightward, and a collecting lens 58 and optical detector 59 for detecting an information reproducing signal from the reflected light of an optical disk medium 61 after forming a small spot of laser beam on the optical disk medium 61.

Figure 2:
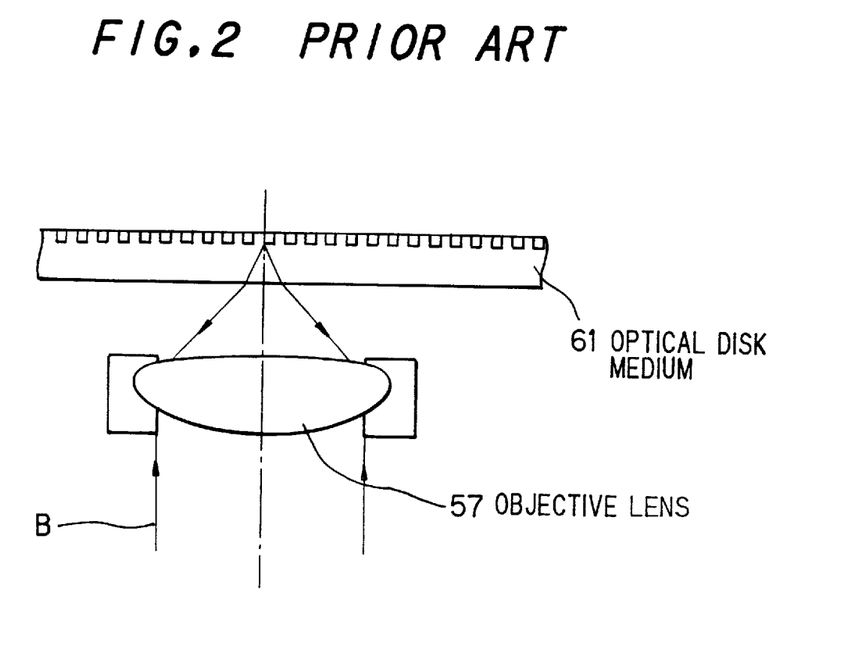
FIG. 2 shows the relationship between an objective lens and a laser beam diameter in FIG. 1, FIGS. 3A to 3C show operational examples of the conventional optical head device in FIG. 1.

In operation, the laser light B emitted from the laser light source 51 is converted into a parallel beam through the collimator lens 53, transmitting through the beam splitter 55, being reflected on the reflecting mirror 56 for rising, and being collected by the objective lens 57. In FIG.2, the collecting state of the laser light B on the optical disk medium is shown.

Light reflected on the signal surface of the optical disk medium 61 is entered through the objective lens 57, reflecting mirror 56 for rising and beam splitter 55 to the light-receiving surface of the optical detector 59 to be converted into an electrical signal. Herein, when the size of the light-receiving portion of the optical detector 59 is smaller than the diameter of the light beam, the light beam is collected by the collecting lens 58 to be entered to the light-receiving surface of the optical detector 59.

The optical disk medium 61 is driven by a spindle motor 62 to rotate. Because of this, the optical disk medium 61 may cause surface pitching or eccentrical movement. To properly make a small beam spot follow up against the surface pitching or eccentric movement, the objective lens 57 can be disposed to be shifted forward and backward or leftward and rightward by the lens actuator 60.

Meanwhile, the diameter of the laser beam emitted from the laser light source 51 is set to be equal to the effective diameter of the objective lens 57 so that the effective diameter of the objective lens 57 may be maximumly utilized when the laser beam enters the objective lens 57. When the objective lens 57 is located at the center, a micro pit is formed on the recording surface of the optical disk medium 61 in the state that the effective diameter of the objective lens 57 can be maximumly utilized(refer to FIG. 2).

The diameter of the laser beam spot focused on the optical disk medium 61 is determined by the wavelength $\lambda$ of the laser light source and the numerical aperture(NA) of the objective lens 57. Since the spot diameter is proportional to '$\lambda$/NA', NA of the objective lens 57 and wavelength $\lambda$ are specified so that information pits recorded on the optical disk medium 61 can be reproduced.

As described above, NA of the objective lens 57 and wavelength $\lambda$ of the light source can be set to reproduce a signal. However, when the wavelength $\lambda$ of the light source is excessively shortened or NA of the objective lens 57 is excessively increased, the inclination of the optical disk medium 61 may be affected. Therefore, they are set to match with the size of the recording pit formed on the optical disk medium 61. Thus, in the conventional optical head device, the objective lens 57 is designed to be shifted leftward and rightward in FIG. 1 to follow up the eccentrical movement of the optical disk medium 61.

However, when the objective lens 57 is shifted, the center of the emitted beam is shifted from the center of the objective lens 57. Therefore, the effective diameter cannot be maximumly utilized and the diameter of the spot focused on the optical disk medium 61 may be increased more than when the objective lens 57 is located at the center.

Figure 3A:
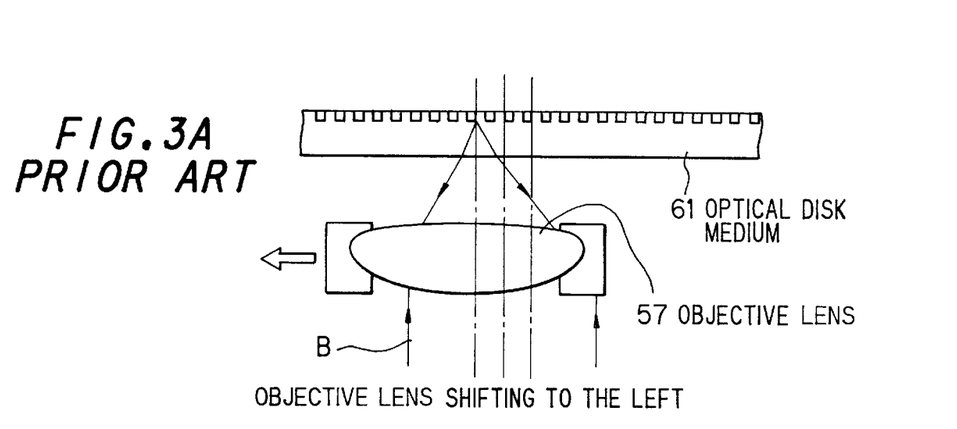
Figure 3B:
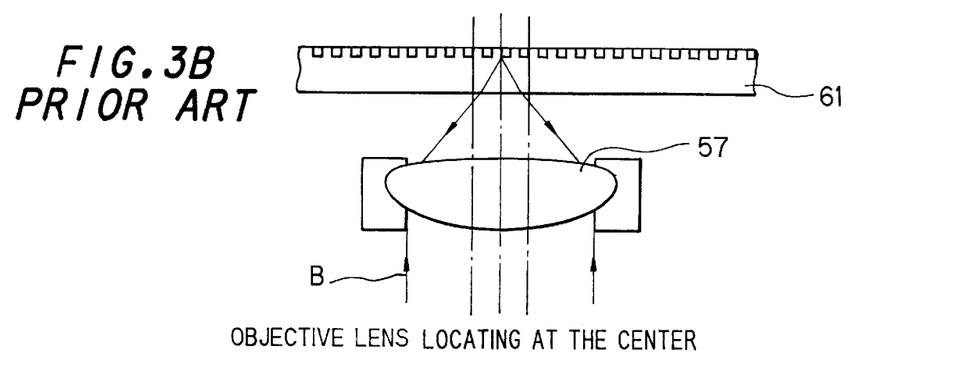
Figure 3C:
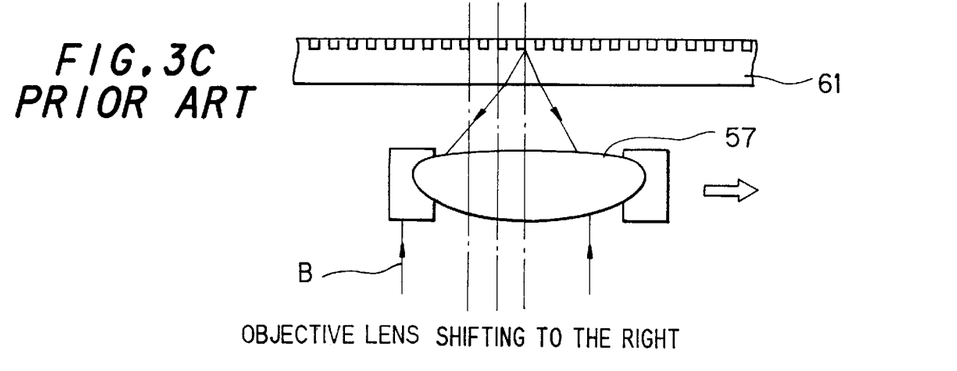

FIGS. 3A to 3C show operation examples in such case. FIG. 3A shows the case that the objective lens 57 is shifted to the left, FIG. 3B shows the case that the objective lens 57 is located at the center, and FIG. 3C shows the case that the objective lens 57 is shifted to the right. In FIGS. 3A and 3C, the center of the objective lens 57 is apparently shifted from the center of the laser light B. In such cases, a part of the laser light B cannot enter the objective lens 57. Therefore, the level of the laser beam spot focused by the objective lens 57 must be decreased, thereby causing the deterioration of the reproduced signal obtained from the reflected light on the optical disk medium 61. Furthermore, since the center of the objective lens may be more shifted in high-speed access, the deterioration of the reproduced signal will be enlarged more than the level of eccentrical movement. Thus, it will take a certain time period until the reproduced signal is detected. Therefore it becomes a bar to the shortening of access time.

SUMMARY OF THE INVENTION

Accordingly, it is an object of the invention to provide an optical head device in which the deterioration of the reproduced signal can be suppressed.

It is a further object of the invention to provide an optical head device in which further high-speed access can be performed even when the eccentrical movement of the optical disk medium has occurred.

According to the invention, an optical head device, comprises:

a laser light source;

an objective lens to which light emitted from the laser light source is entered through a beam splitter and in which the light is collected to be focused as a very small spot on a recording surface of an optical disk medium;

an optical detector to which modulated light reflected on the recording surface of the optical disk medium is entered through the objective lens and the beam splitter; and a shading plate which is located between the laser light source and the beam splitter and through which a central part of the light emitted from the laser light source is passed;

wherein the objective lens is designed to have an effective diameter greater than a diameter of the laser light output from the beam splitter.

According to another aspect of the invention, an optical head device, comprises:

a laser light source;

an objective lens to which light emitted from the laser light source is entered through a beam splitter and in which the light is collected to be focused as a very small spot on a recording surface of an optical disk medium;

an optical detector to which modulated light reflected on the recording surface of the optical disk medium is entered through the objective lens and the beam splitter; and a collimator lens which is located between the laser light source and the beam splitter;

wherein a diameter of laser light output from the collimator is designed to be smaller than an effective diameter of the objective lens.

According to another aspect of the invention, an optical head device, comprises:

a laser light source;

an objective lens to which light emitted from the laser light source is entered through a beam splitter and in which the light is collected to be focused as a very small spot on a recording surface of an optical disk medium; and an optical detector to which modulated light reflected on the recording surface of the optical disk medium is entered through the objective lens and the beam splitter;

wherein the laser light source emits laser light with a small spread angle such that the laser light emitted from the laser light source has a diameter smaller than an effective diameter of the objective lens when the laser light is output from the beam splitter to the objective lens.

BRIEF DESCRIPTION OF THE DRAWINGS

The invention will be explained in more detail in conjunction with the appended drawings, wherein.

DESCRIPTION OF THE PREFERRED EMBODIMENTS

An optical head device in the first preferred embodiment will be explained in FIG. 4, wherein like parts are indicated by like reference numerals as used in FIG. 1, for example, 61 indicates an optical disk medium and 62 indicates a spindle motor for rotatably driving the optical disk medium.

The optical head device 1 comprises a laser light source 11, a collimator lens 11A in which laser light B emitted from the laser light source 11 is converted into a parallel beam, a beam splitter 12 for transmitting the parallel beam from the collimator lens 11A, an objective lens 13 for focusing the transmitted light of the beam splitter 12 as a very small spot on the recording surface of the optical disk medium 61, and an optical detector 14 to which the modulated light reflected on the surface of the optical disk medium 61 is entered through the objective lens 13 and beam splitter 12.

13A indicates a lens actuator which moves the objective lens 13 following the eccentrical movement of the optical disk medium 61. 16 indicates a collecting lens for collecting the modulated reflected light when coming into the optical detector 14.

Figure 4:
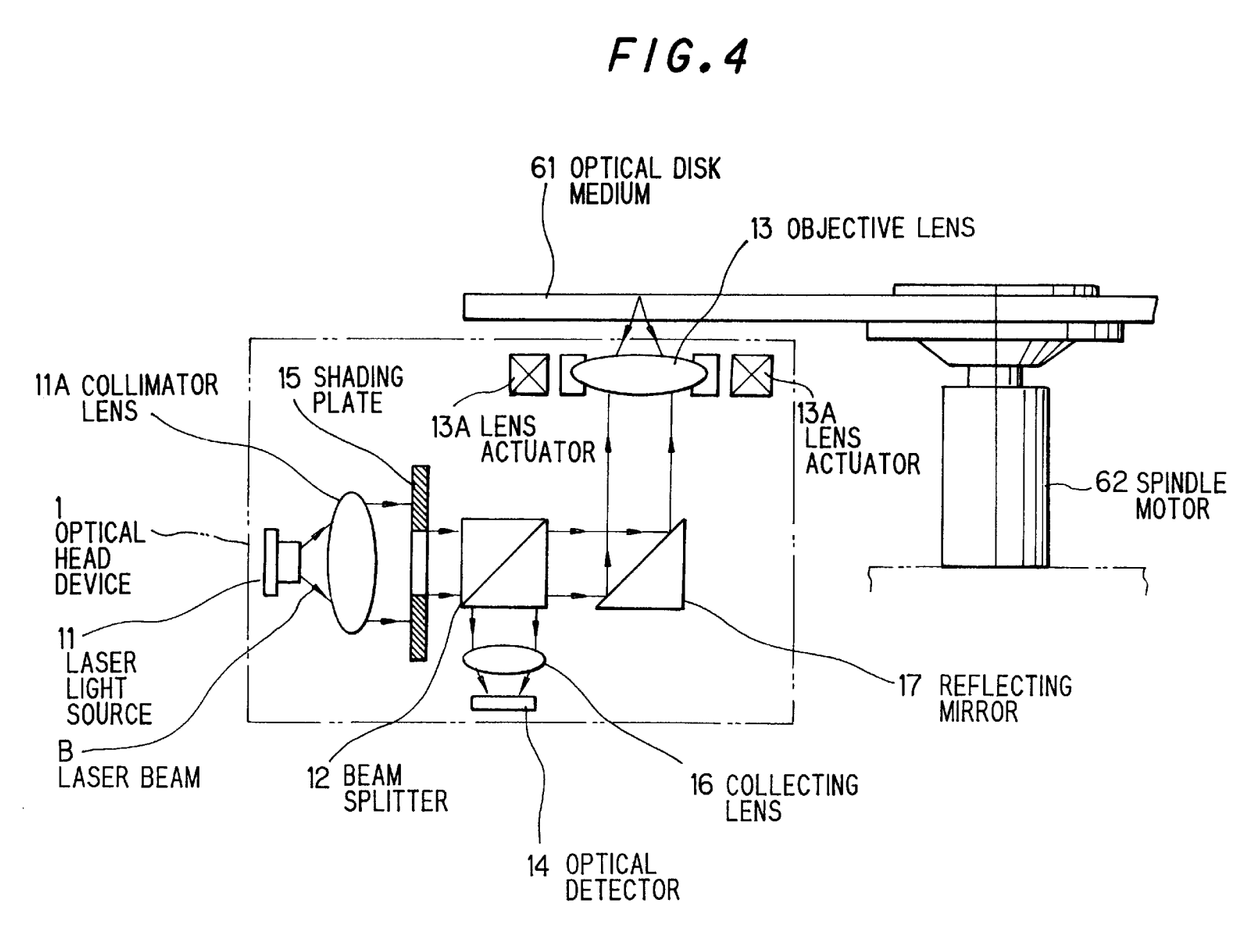
FIG. 4 shows an explanatory schematic diagram showing an optical head device in a first preferred embodiment according to the invention.

Meanwhile, the light path of the laser light B emitted from the laser light source 11 is, as shown in FIG. 4, set to be parallel to the surface of the optical disk medium 61. Thus, to direct the laser light B to the surface of the optical disk medium 61, a reflecting mirror 17 for rising the light is provided between the beam splitter and objective lens 13.

Furthermore, between the collimator lens 11A and the beam splitter 12, provided is a shading plate 15 by which a central part of the laser light B emitted from the laser light source 11 is passed through. Moreover, the effective diameter of objective lens 13 is set to be greater than the diameter of the laser light B which is sent from the beam splitter 12.

In operation, the laser light B emitted from the laser light source 11 is first, as shown in FIG. 4, converted into a parallel beam by the collimator lens 11B. Next, the circumferential part of the parallel beam is shaded by the shading plate 15, allowing only the central part thereof to pass through. Thereafter, the laser beam B is entered through the beam splitter 12 and reflecting mirror 17 for rising to the central portion of the objective lens 13. The laser beam B is collected by the objective lens 13 to form a very small spot on the recording surface on the optical disk medium 61, being modulated with the information recorded on the optical disk medium 61, and returning to the objective lens 13. The laser beam B is again turned into a parallel beam by the objective lens 13 on the way back, being reflected on the reflecting mirror 17, then being directed to the collecting lens 16 by the beam splitter 12. The collecting lens 16 allows the laser beam to be collected to a spot size proper to be read out by the optical detector 14. Then, the collected light spot is converted into an electrical signal by the optical detector 14.

Figure 5:
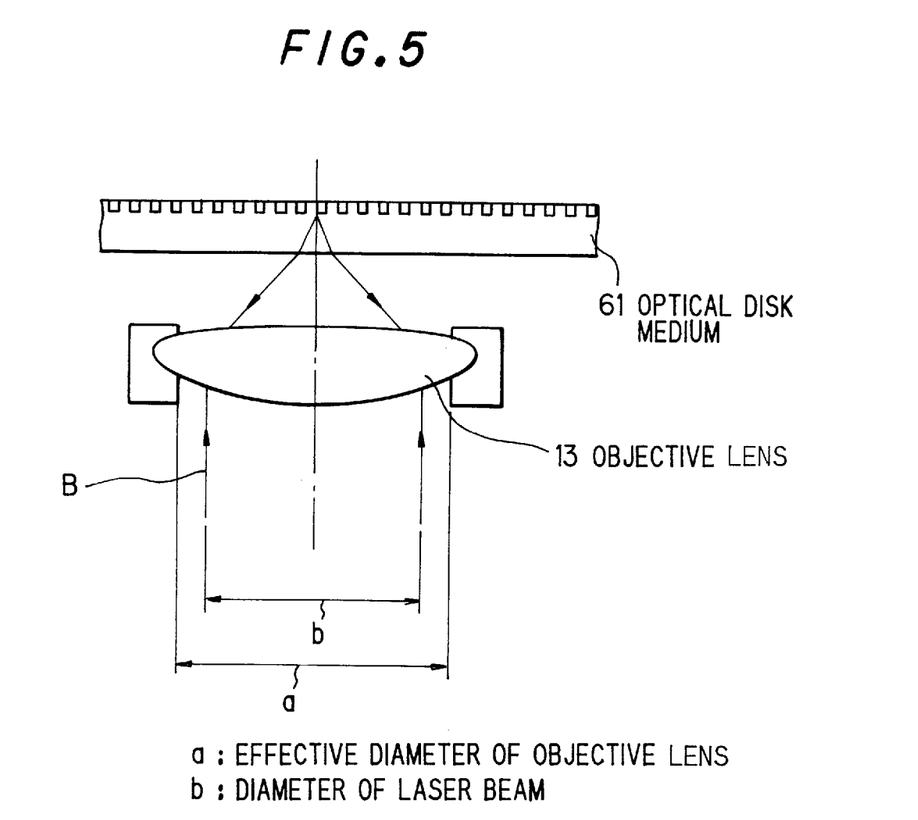
FIG. 5 shows the relationship between an objective lens and a laser beam diameter in FIG. 4, FIGS. 6A to 6C show operational examples of the optical head device in FIG. 4.

The objective lens 13 is, as shown in FIG. 5, designed to have an effective diameter a sufficiently greater than the diameter b of the laser beam, so that the entire incident light can be sufficiently received by it even when the objective lens 13 is shifted when the laser light B emitted from the laser light source 11 is entered to the objective lens 13. In FIG. 2, the effective diameter a of the objective lens 13 is, for example, designed to be 30 to 40% greater than the diameter b of the laser beam.

Figure 6A:
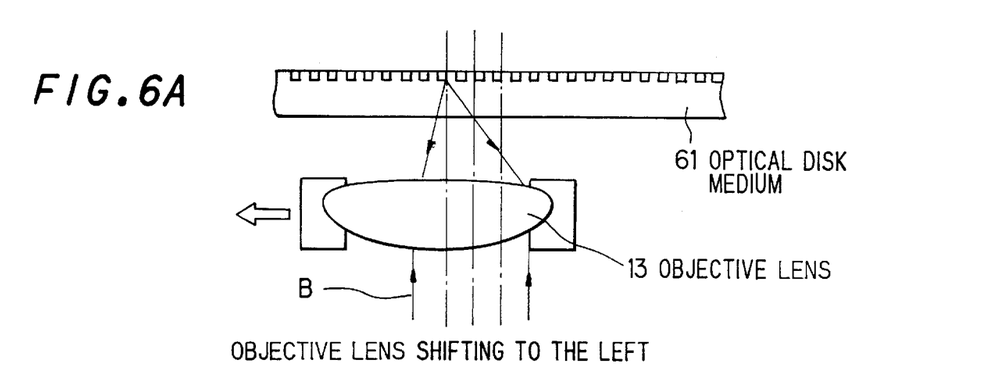
Figure 6B:
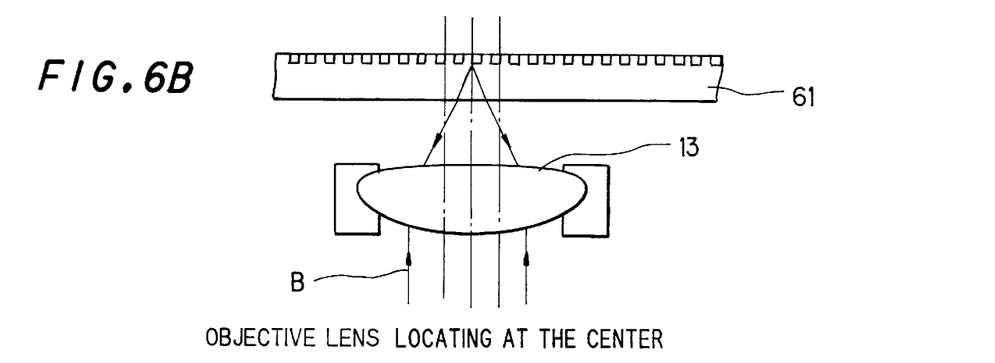
Figure 6C:
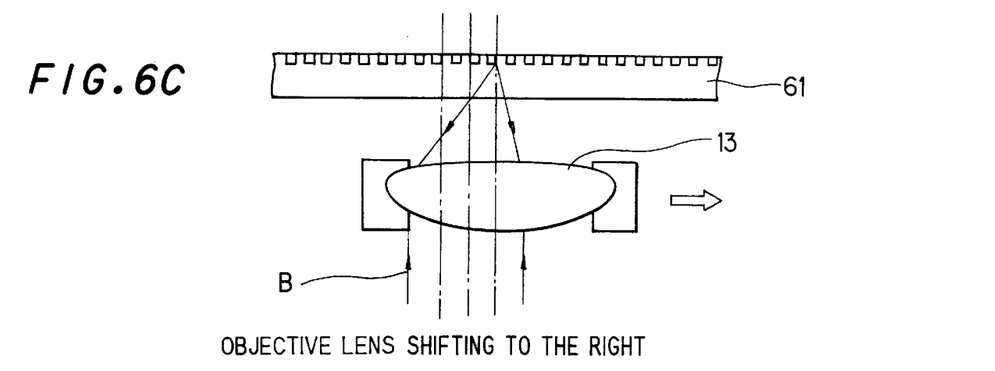

In FIGS. 6A to 6C, the cases are shown where the objective lens 13 is shifted, the amount of shifting being equal to that of the cases shown in FIGS. 3A to 3C. FIG. 6A shows the case where the objective lens 13 is shifted to the left, FIG. 6B shows the case where the central axis of the objective lens 13 coincides with the central axis of the laser light B, and FIG. 6C shows the case where the objective lens 13 is shifted to the right.

As seen from FIGS. 6A to 6C, in the first embodiment, the entire laser light B is received within the effective diameter a even when the objective lens 13 is shifted, while in the conventional device the laser light B is, as shown in FIG. 3A and 3C, partly brought out of the objective lens 57 when the objective lens 57 is shifted. Thus, in the first embodiment, the diameter of the beam spot to be focused is not degraded even when the objective lens 13 is shifted.

Figure 7:
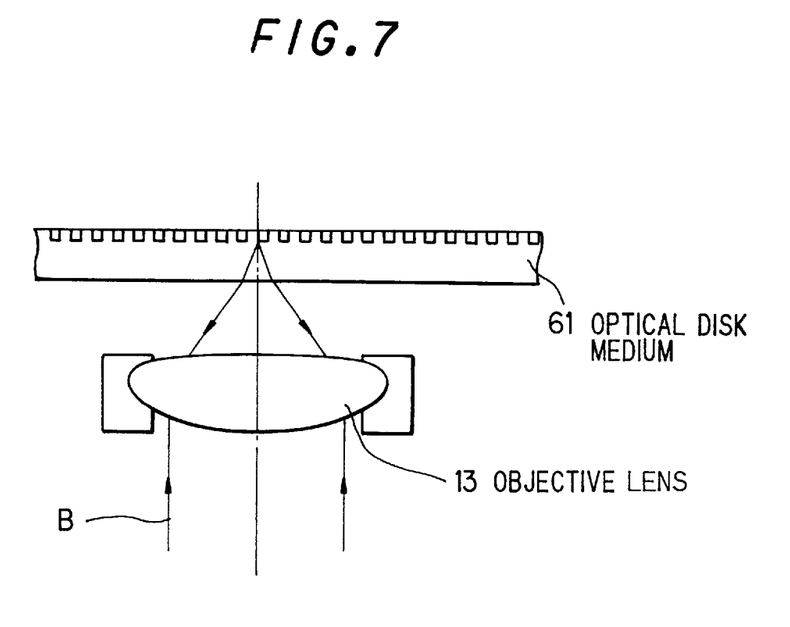
FIG. 7 shows the relationship between an objective lens and a laser beam diameter when a wavelength of laser beam is shortened.

Here, if the objective lens 13 which is the same as in the first embodiment and a light source which emits laser light B with a shorter wavelength $\lambda$ are used and the laser light B is, as shown in FIG. 7, arranged to pass through only the central part of the objective lens 13, the effective NA is decreased. Thus, the mechanical properties can be improved since the permissible inclination value is proportional to $\lambda/NA^2$.

Furthermore, an optical head device in the second preferred embodiment will be explained in FIG. 8, wherein like parts are indicated by like reference numerals as used in FIG. 4.

Figure 8:
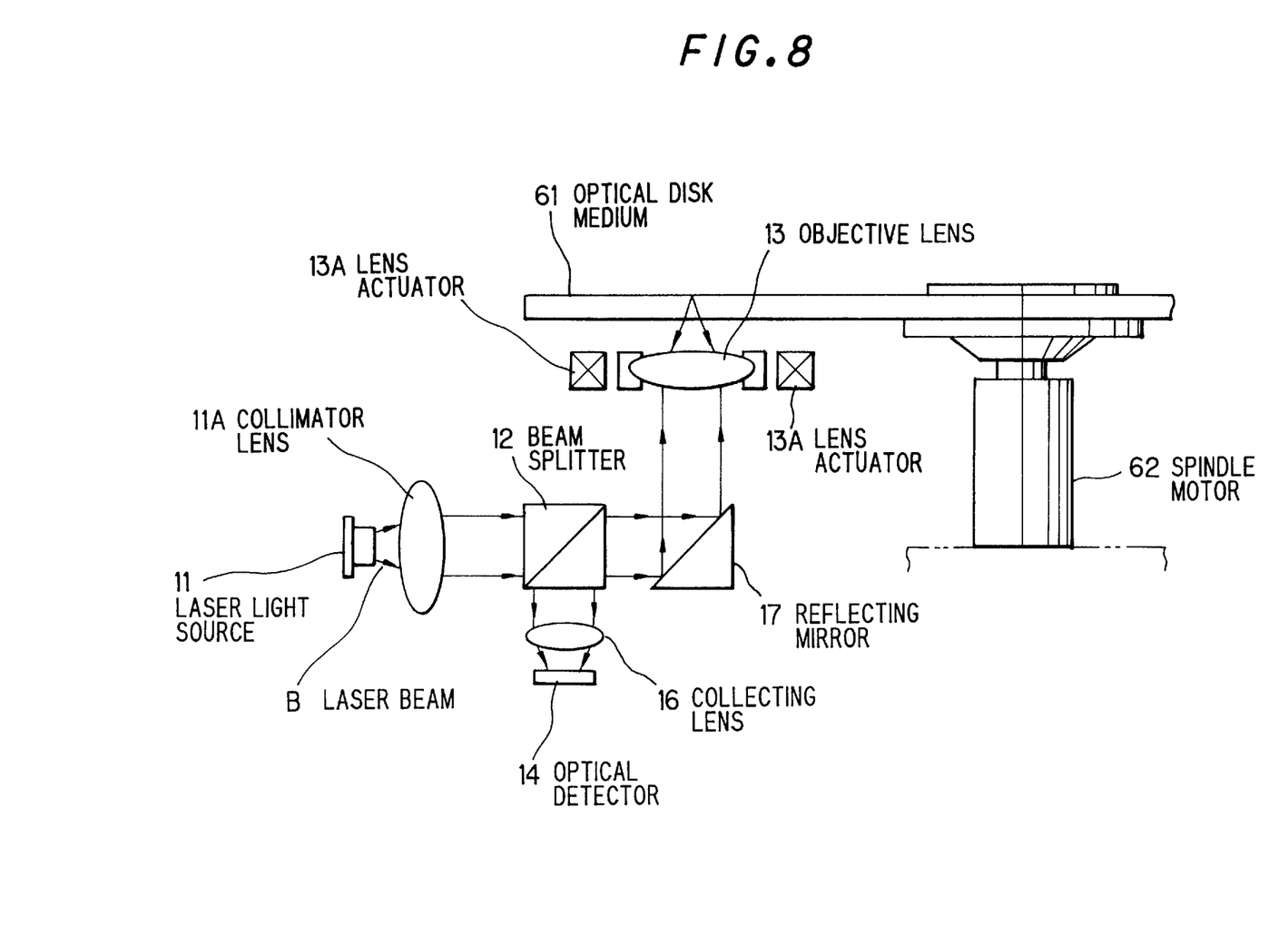
FIG. 8 shows an explanatory schematic diagram showing an optical head device in a second preferred embodiment according to the invention.

In the second embodiment, the shading plate 15 in the first embodiment is, as shown in FIG. 8, removed and the laser light B emitted from the laser light source 11 is directly converted into a parallel beam with a diameter smaller than the diameter of the objective lens 13 by the collimator lens 11A.

When the collimator lens 11A is located nearer to the laser light source 11 than that in the first embodiment, the parallel beam with the smaller beam diameter can be obtained since the laser light B emitted from the laser light source has a certain spread. Thus, the laser light B emitted is converted into the parallel beam to have the beam diameter smaller than the effective diameter of the objective lens 13 by the collimator lens 11A, then being passed through the beam splitter 12 and reflecting mirror 16 for rising, and being entered to the central part of the objective lens 13.

The other composition in the second embodiment is the same as that in the first embodiment.

The optical head device as composed above has functions similar to those of the optical head device in the first embodiment. In addition, the optical head device in the second embodiment allows the shading plate 15 to be removed to simplify the device composition and to reduce the fabrication cost.

Figure 9:
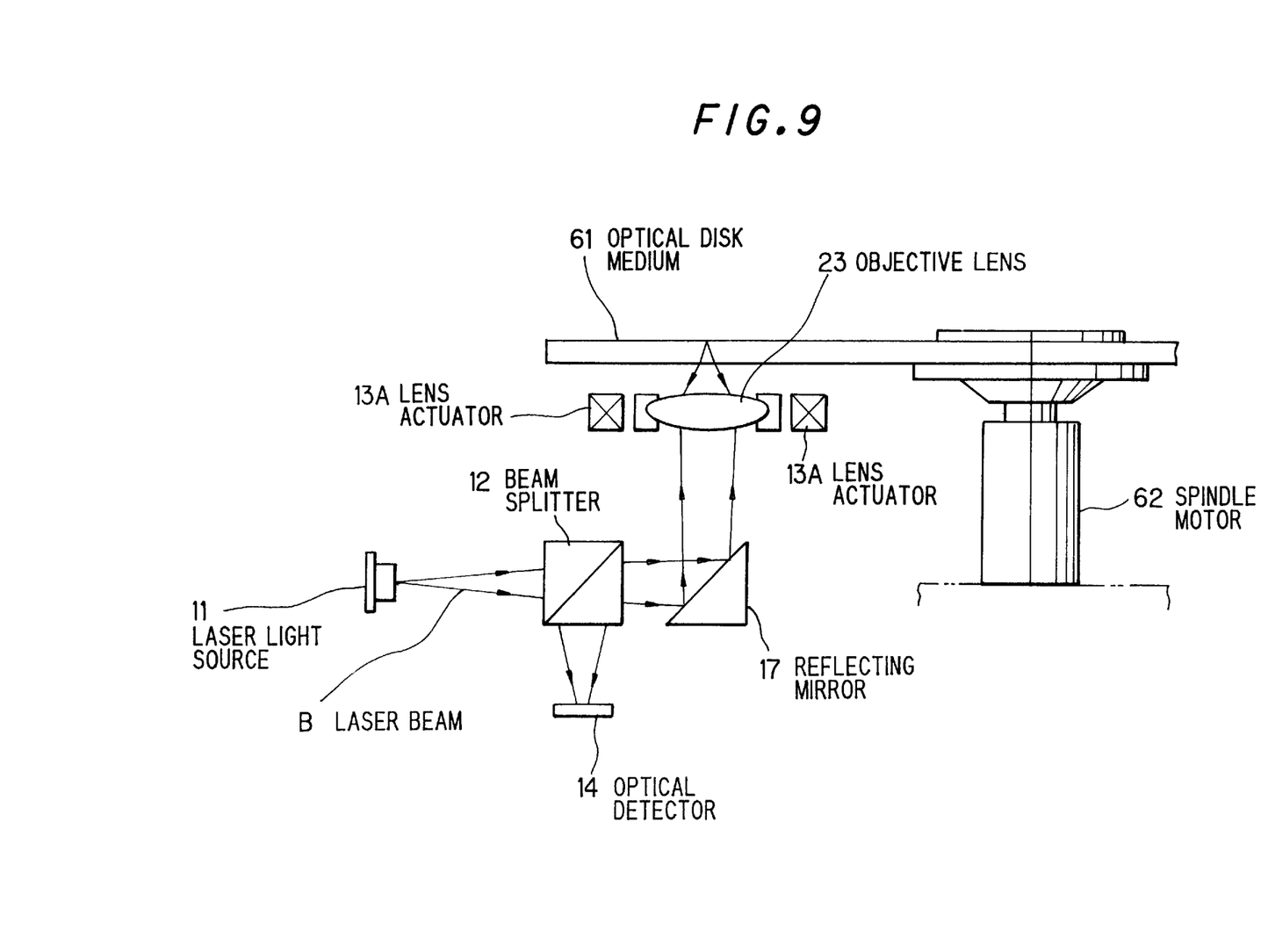
FIG. 9 shows an explanatory schematic diagram showing an optical head device in a third preferred embodiment according to the invention.

An optical head device in the third preferred embodiment will be explained in FIG. 9, wherein like parts are indicated by like reference numerals as used in FIG. 4.

In the third embodiment, optical components are located such that the laser light B emitted from the laser light source 11 has a beam diameter smaller than the effective diameter of the objective lens 23 when entering the objective lens 23. In this case, the laser light source 11 may be in advance adjusted such that it emits laser light B with a smaller spread.

In the third embodiment, the collimator lens 11A and shading plate 15 required in the first embodiment are removed. In addition, the collecting lens 16 is not necessary. The other composition in the third embodiment is the same as that in the first embodiment.

The optical head device as composed above has functions similar to those of the optical head device in the first embodiment. In addition, the optical head device in the third embodiment allows the collimator lens 11A, shading plate 15 and collecting lens 16 to be removed to further simplify the device composition and to further reduce the fabrication cost.

Though in the first to third embodiments the path of the light output from the laser light source 11 is arranged to be in parallel with the surface of the optical disk medium 61, the light path may be arranged to be normal to the surface of the optical disk medium 61.

Although the invention has been described with respect to specific embodiment for complete and clear disclosure, the appended claims are not to be thus limited but are to be construed as embodying all modification and alternative constructions that may occur to one skilled in the art which fairly fall within the basic teaching here set forth.

What is claimed is:

1. An optical head device, comprising:

a laser light source;

an objective lens, to which light emitted from said laser light source is entered through a beam splitter and in which the light is collected to be focused as a very small spot on a recording surface of an optical disk medium;

a lens actuator, provided to move said objective lens over a predetermined range of movement, to correct for surface pitching or eccentric movement of said optical disk medium;

an optical detector, to which modulated light reflected on said recording surface of said optical disk medium and through said objective lens and said beam splitter is entered; and a shading plate, located between said laser light source and said beam splitter and through which a central portion of said light emitted from said laser light source is passed;

wherein said laser light emitted from said beam splitter has a smaller diameter than an effective diameter of said objective lens, and said laser light is received entirely within said effective diameter of said objective lens over the entire predetermined range of movement of said objective lens.

2. An optical head device, according to claim 1, further comprising:

a collimator lens, located between said laser light source and said shading plate and in which said light emitted from said laser light source is converted into a parallel beam.

* * * * *

UNITED STATES PATENT AND TRADEMARK OFFICE
CERTIFICATE OF CORRRECTION

PATENT NO. : 5,822,295
DATED : Oct. 13, 1998
INVENTOR(S) : Sohmuta

It is certified that error appears in the above-identified patent and that said Letters Patent is hereby corrected as shown below:

On the title page, under item [56], References Cited, insert the following:

FOREIGN PATENT DOCUMENTS

| | | DOCUMENT NUMBER | | | | | PUBLICATION DATE | COUNTRY OR PATENT OFFICE | CLASS | SUBCLASS | TRANSLATION YES | NO |
|---|---|---|---|---|---|---|---|---|---|---|---|---|
| | JP-A | 59 | 15 | 25 | 4 | 2 | 08/31/84 | JAPAN | | | | |
| | JP-A | 6 | | 84 | 19 | 9 | 03/25/94 | JAPAN | | | | |
| | | | | | | | | | | | | |

Signed and Sealed this

Thirteenth Day of April, 1999

*Attest:*

Q. TODD DICKINSON

*Attesting Officer*     *Acting Commissioner of Patents and Trademarks*